United States Patent
Kobayashi et al.

(10) Patent No.: US 7,014,323 B2
(45) Date of Patent: Mar. 21, 2006

(54) IMAGE PROCESSING SYSTEM, PROJECTOR, PROGRAM, INFORMATION STORAGE MEDIUM AND IMAGE PROCESSING METHOD

(75) Inventors: Masanobu Kobayashi, Suwa (JP); Hideki Matsuda, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 73 days.

(21) Appl. No.: 10/790,214

(22) Filed: Mar. 2, 2004

(65) Prior Publication Data
US 2004/0227830 A1 Nov. 18, 2004

(30) Foreign Application Priority Data
Mar. 7, 2003 (JP) .............................. 2003-061832

(51) Int. Cl.
G03B 21/00 (2006.01)
G03B 21/14 (2006.01)
H04N 3/22 (2006.01)

(52) U.S. Cl. .................. 353/69; 353/101; 353/121; 348/745; 348/806

(58) Field of Classification Search ............ 353/69–70, 353/10, 101, 121; 348/744–747, 806–807, 348/653, 679
See application file for complete search history.

(56) References Cited

U.S. PATENT DOCUMENTS

| 5,764,311 A * | 6/1998 | Bonde et al. ............... 348/746 |
| 6,361,171 B1 | 3/2002 | Ejiri et al. |
| 6,367,933 B1 | 4/2002 | Chen et al. |
| 6,520,647 B1 * | 2/2003 | Raskar ........................ 353/70 |
| 6,592,228 B1 * | 7/2003 | Kawashima et al. ........ 353/101 |
| 2002/0036723 A1 | 3/2002 | Ishii et al. |

FOREIGN PATENT DOCUMENTS

| EP | 0 703 714 A2 | 3/1996 |
| JP | B2 2720824 | 1/1997 |
| JP | A 2000-241874 | 9/2000 |
| JP | A 2001-61121 | 3/2001 |
| WO | WO 99/14716 | 3/1999 |
| WO | WO 02/101443 A2 | 12/2002 |

OTHER PUBLICATIONS

Sukthankar et al., "Automatic Kesystone Correction for Camera-Assisted Presentation Interfaces," Lecture Notes in Computer Science, pp. 607-614, Oct. 14, 2000.

* cited by examiner

Primary Examiner—W. B. Perkey
Assistant Examiner—Magda Cruz
(74) Attorney, Agent, or Firm—Oliff & Berridge, PLC

(57) ABSTRACT

To provide an image processing system and the like which can perform an image distortion correction and focus adjustment approximately at the same time without changing a projecting position intended by a user, a projector includes: a distortion correcting section which corrects image signals to adjust the distortion in an image; an image projection section which includes a lens unit having a focus adjustment function, the lens unit projecting an image based on the corrected image signals; a control section and a focus lens driving section which control the driving of the lens unit so that the focal length of the lens unit to an image projection area changes; a sensing section which senses the projected image; and a distortion correction amount deriving section which derives the focal length to the center of the image projection area and also an amount of distortion correction for the distortion correcting section, based on sensing information.

12 Claims, 12 Drawing Sheets

IMAGE PROCESSING SYSTEM, PROJECTOR, PROGRAM, INFORMATION STORAGE MEDIUM AND IMAGE PROCESSING METHOD

Japanese Patent Application No. 2003-61832, filed on Mar. 7, 2003, is hereby incorporated by reference in its entirety.

BACKGROUND OF THE INVENTION

The present invention relates to an image processing system, projector, program, information storage medium and image processing method which can correct the distortion of an image and also adjust a focus.

An image projected from an image display device such as a projector may be distorted to create a so-called keystone distortion in the vertical or horizontal direction, depending on the relationship between the image display device and a position onto which the image is projected therefrom. Even if the image display device is placed substantially correctly relative to an object to be projected, the image may be defocused when the distance between the image display device and the object to be projected varies.

Thus, the image display device must display an image with no image distortion or defocusing.

In a general projector with functions of image distortion correction and auto-focus, however, a user semi-automatically corrects the distortion in an image by indicating four corners in a screen by the use of a mouse or the like. Additionally, to perform the auto-focusing function in the general projector, calibration images have been projected after the correction of image distortion has been released once. In this case, if the projector again corrects the image distortion, the corrected projection area cannot be adequately focused.

It is troublesome for the user to indicate the four corners in the screen using the mouse or the like.

To overcome such a problem, for example, Japanese Patent Laid-Open No. 2000-241874 has proposed an automatic screen-position adjusting apparatus for projector which includes a projection lens capable of adjusting the focus, zooming, elevation angle and tilt angle, a monitor camera located on the forward face of the main projector body for sensing an image projected onto a screen, data conversion means for converting information of image signals inputted from the monitor camera into digital data and storing the converted digital data, computation means for computing the converted digital data from the data conversion means, means for adjusting the focus of the projection lens, zooming drive means for zooming the projection lens, means for detecting the position of the screen within the sensed by the monitor camera, and means for adjusting the keystone distortion in the projected image based on the data of the detected screen position.

However, the technique of Japanese Patent Laid-Open No. 2000-241874, is to project and sense a test pattern image to detect the best focus, to adjust the focus, to project and sense an all-white image to detect endpoint nodes on a screen, to reduce or magnify a projection range until the projected image reaches the endpoint nodes of the screen by zooming, and to adjust the orientation of the forward face of the main projector body or angles of depression and elevation so that the projected image is located in the center of the screen.

This technique further examines and adjusts the keystone distortion by comparing the lengths of the opposed sides of the screen within the sensed image with each other.

The technique of Japanese Patent Laid-Open No. 2000-241874 cannot possibly provide the best focus originally intended by the user in the keystone-distorted image since it corrects the keystone distortion after the focus has been adjusted once as described.

Moreover, the detection of the screen position requires a high-resolution camera, resulting in increase of the manufacturing cost.

The technique of Japanese Patent Laid-Open No. 2000-241874 further adjusts the angles of depression and elevation in the main projector body so that the image is forcedly projected in the center of the screen taking no account of the original image projecting position. Such a process premises that the main projector body is located substantially in direct front of the screen.

In fact, however, a laterally keystone distortion occurs if the main projector body is not located substantially in direct front of the screen. If the process is made presuming that the main projector body is located substantially in direct front of the screen, thus, the laterally keystone distortion cannot properly be corrected.

An image intended by the user cannot be displayed if the angles of depression and elevation in the main projector body are adjusted so that the image is forcedly projected in the center of the screen taking no account of the projecting position intended by the user. More particularly, it is conceivable that the user may project an image on the screen only at its right half since there is an obstacle in front of the central screen location.

BRIEF SUMMARY OF THE INVENTION

The present invention is made in view of the above-mentioned problem and may provide an image processing system, projector, program, information storage medium and image processing method which can carry out image distortion correction and focus approximately at the same time without changing the projecting position intended by a user.

To solve the above mentioned problem, an image processing system and a projector according to one aspect of the present invention includes:

distortion correction means for correcting image signals to adjust the distortion in an image;

image projection means including a lens unit which has a focus adjustment function, the lens unit projecting an image based on the corrected image signals;

drive control means for controlling driving of the lens unit so that a focal length of the lens unit to an image projection area changes;

sensing means for sensing the projected image; and distortion correction amount deriving means for deriving the focal length to a center of the image projection area and deriving an amount of distortion correction for the distortion correction means, based on sensing information from the sensing means, wherein the distortion correction amount deriving means determines an optimum focal length to each of a plurality of boundary points in the image projection area, based on a change of luminance in a sensed image according to the sensing information; derives the focal length to the center of the image projection area, based on the optimum focal length to each of the boundary points; derives coordinates of the boundary points in a three-dimensional space, based on the optimum focal length to each of the boundary points and horizontal and vertical half angle-of-views in the image projection means; and derives the amount of distortion correction, based on the coordinates in the three-dimensional space, wherein the distortion correction means corrects the image signals, based on the derived amount of distortion correction, and wherein the drive control means controls the driving of the lens unit so that the focal length of the lens unit becomes the focal length to the center of the image projection area derived by the distortion correction amount deriving means.

An image processing system and a projector according to another aspect of the present invention includes:

a distortion correction section which corrects image signals to adjust the distortion in an image;

an image projection section which includes a lens unit which has a focus adjustment function, the lens unit projecting an image based on the corrected image signals;

a drive control section which controls driving of the lens unit so that a focal length of the lens unit to an image projection area changes;

a sensing section which senses the projected image; and a distortion correction deriving section which derives the focal length to a center of the image projection area and derives an amount of distortion correction provided by the distortion correction section, based on sensing information from the sensing section, wherein the distortion correction deriving section determines an optimum focal length to each of a plurality of boundary points in the image projection area, based on a change of luminance in a sensed image according to the sensing information; derives the focal length to the center of the image projection area, based on the optimum focal length to each of the boundary points; derives coordinates of the boundary points in a three-dimensional space, based on the optimum focal length to each of the boundary points and horizontal and vertical half angle-of-views in the image projection section; and derives the amount of distortion correction, based on the coordinates in the three-dimensional space, wherein the distortion correction section corrects the image signals, based on the derived amount of distortion correction, and wherein the drive control section controls the driving of the lens unit so that the focal length of the lens unit becomes the focal length to the center of the image projection area derived by the distortion correction deriving section.

A program according to a further aspect of the present invention is a computer-readable program for causing a computer to function as:

distortion correction means for correcting image signals to adjust the distortion in an image;

drive control means for controlling driving of a lens unit and driving of a sensing section, the lens unit projecting an image based on the corrected image signals and having a focus adjustment function for changing a focal length of the lens unit to an image projection area, and the sensing section sensing the projected image; and distortion correction amount deriving means for deriving the focal length to a center of the image projection area and deriving an amount of distortion correction for the distortion correction means, based on sensing information from the sensing means, wherein the distortion correction amount deriving means determines an optimum focal length to each of a plurality of boundary points in the image projection area, based on a change of luminance in a sensed image according to the sensing information; derives the focal length to the center of the image projection area, based on the optimum focal length to each of the boundary points; derives coordinates of the boundary points in a three-dimensional space, based on the optimum focal length to each of the boundary points and horizontal and vertical half angle-of-views in the image projection means; and derives the amount of distortion correction, based on the coordinates in the three-dimensional space, wherein the distortion correction means corrects the image signals, based on the derived amount of distortion correction, and wherein the drive control means controls the driving of the lens unit so that the focal length of the lens unit becomes the focal length to the center of the image projection area derived by the distortion correction amount deriving means.

An information storage medium according to a still further aspect of the present invention stores a computer-readable program for causing a computer to function as:

distortion correction means for correcting image signals to adjust the distortion in an image;

drive control means for controlling driving of a lens unit and driving of a sensing section, the lens unit projecting an image based on the corrected image signals and having a focus adjustment function for changing a focal length of the lens unit to an image projection area, and the sensing section sensing the projected image; and distortion correction amount deriving means for deriving the focal length to a center of the image projection area and deriving an amount of distortion correction for the distortion correction means, based on sensing information from the sensing means, wherein the distortion correction amount deriving means determines an optimum focal length to each of a plurality of boundary points in the image projection area, based on a change of luminance in a sensed image according to the sensing information; derives the focal length to the center of the image projection area, based on the optimum focal length to each of the boundary points; derives coordinates of the boundary points in a three-dimensional space, based on the optimum focal length to each of the boundary points and horizontal and vertical half angle-of-views in the image projection means; and derives the amount of distortion correction, based on the coordinates in the three-dimensional space, wherein the distortion correction means corrects the image signals, based on the derived amount of distortion correction, and wherein the drive control means controls the driving of the lens unit so that the focal length of the lens unit becomes the focal length to the center of the image projection area derived by the distortion correction amount deriving means.

An image processing method according to a yet further aspect of the present invention includes:

projecting a predetermined calibration image while changing a focal length of a lens unit;

sensing the calibration image depending on a change in the focal length of the lens unit;

determining an optimum focal length to each of a plurality of boundary points in an image projection area, based on a change of luminance in a sensed image according to sensing information;

deriving coordinates of the boundary points in a three-dimensional space, based on the optimum focal length to each of the boundary points and horizontal and vertical half angle-of-views in image projection means;

deriving an amount of distortion correction, based on the coordinates in the three-dimensional space;

correcting image signals so that distortion in the image is corrected, based on the derived amount of distortion correction;

deriving a focal length to a center of the image projection area, based on the optimum focal length to each of the boundary points in the image projection area;

changing the focal length of the lens unit so that the focal length of the lens unit becomes the derived focal length to the center of the image projection area; and projecting the image, based on the corrected image signals.

The image processing system and the like can correct the distortion in the image by deriving coordinates in a plurality of boundary points in the three-dimensional space, based on a change in luminance of the image, the optimum focal length of the image projection area to each of the boundary points and half angle-of-views in the horizontal and vertical directions. At the same time, it can drive the lens unit so that the focal length of the lens unit becomes the focal length to the center of the image projection area, based on the optimum focal length to each of the boundary points.

Thus, the image processing system and the like can perform the image distortion correction and focus adjustment approximately at the same time.

With these image processing system, projector, program and information storage medium, the distortion correction amount deriving means may determine the optimum focal length, based on a luminance distribution representing a relationship between luminance and number of pixels in a boundary region around each of the boundary points in a sensed image projection area according to the sensing information, on condition that the luminance distribution inside the sensed image projection area is different from the luminance distribution outside the image projection area.

This image processing method may include determining the optimum focal length, based on a luminance distribution representing a relationship between luminance and number of pixels in a boundary region around each of the boundary points in a sensed image projection area according to the sensing information, on condition that the luminance distribution inside the sensed image projection area is different from the luminance distribution outside the image projection area.

Thus, the image processing system and the like can perform the image distortion correction and focus adjustment approximately at the same time by determining the optimum focal length based on the distribution of luminance without applying any high-resolution camera.

With these image processing system, projector, program, information storage medium, and the image processing method, the image may be rectangular, and each of the boundary points may be the corresponding one of vertexes of the rectangular image.

Thus, the image processing system and the like can perform the image distortion correction and focus adjustment more effectively by handling the respective vertexes in the rectangular image, than a case when the whole image is to be handled.

With these image processing system, projector, program and information storage medium, the image projection means may project a black colored image and a white colored image, and the distortion correction amount deriving means may determine the sensed image projection area, based on a difference between the sensing information for the black colored image and for the white colored image.

This image processing method may further includes:

projecting at least a black colored image and a white colored image as the calibration image; and determining the sensed image projection area, based on a difference between the sensing information for the black colored image and for the white colored image.

Thus, the image processing system and the like can more definitely determine the image projection area, based on a difference between the sensing information of a black colored image and the sensing information of a white colored image.

BRIEF DESCRIPTION OF THE SEVERAL VIEWS OF THE DRAWING

FIG. 3A is a diagrammatic view illustrating a focused image while

FIG. 4A is a diagrammatic view illustrating a defocused image while

DETAILED DESCRIPTION OF THE EMBODIMENT

Figure 1:
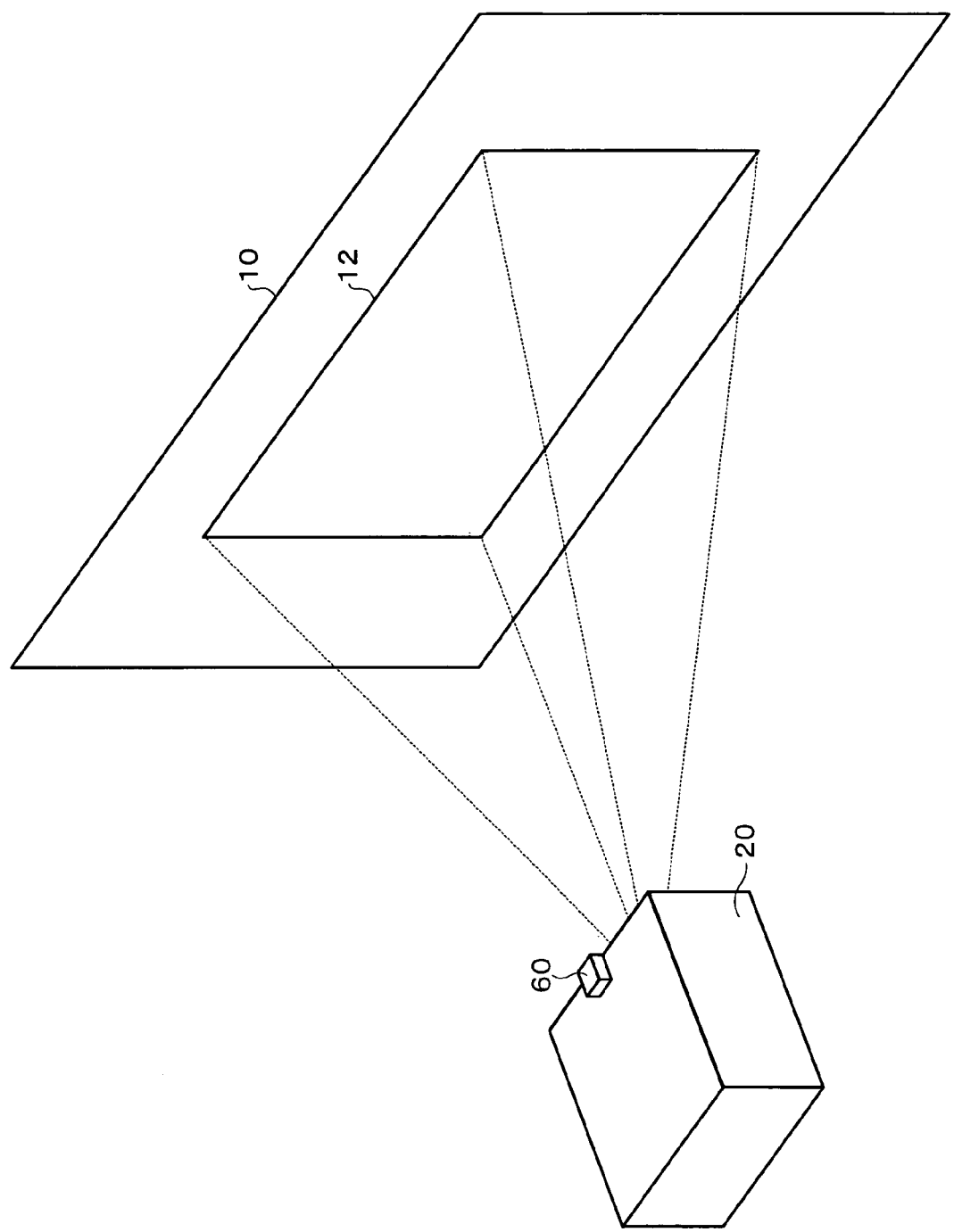
FIG. 1 is a diagrammatic view illustrating a state in which an image is projected.

The present invention will now be described in connection with a projector to which the invention is applied and which can perform the image distortion and focus adjustment approximately at the same time, with reference to the drawing. An embodiment shown in the following is not intended to limit the subject matter of the invention as described in the accompanying claims. All the components shown in such an embodiment is not necessarily essential for practicing the invention defined by the accompanying claims.

Overall System

FIG. 1 is a diagrammatic view illustrating a state in which an image is projected.

A projector 20 forms a rectangular projection area 12 by projecting a rectangular image onto a screen 10. In this embodiment, a color light sensor 60, which is part of sensing means, is to sense the region of the screen 10 including the projection area 12.

In this embodiment, the projector 20 determines the optimum focal length to each of the four corners (boundary points) in the projection area 12, based on a change of luminance in the image due to the sensing information from the color light sensor 60.

Figure 2:
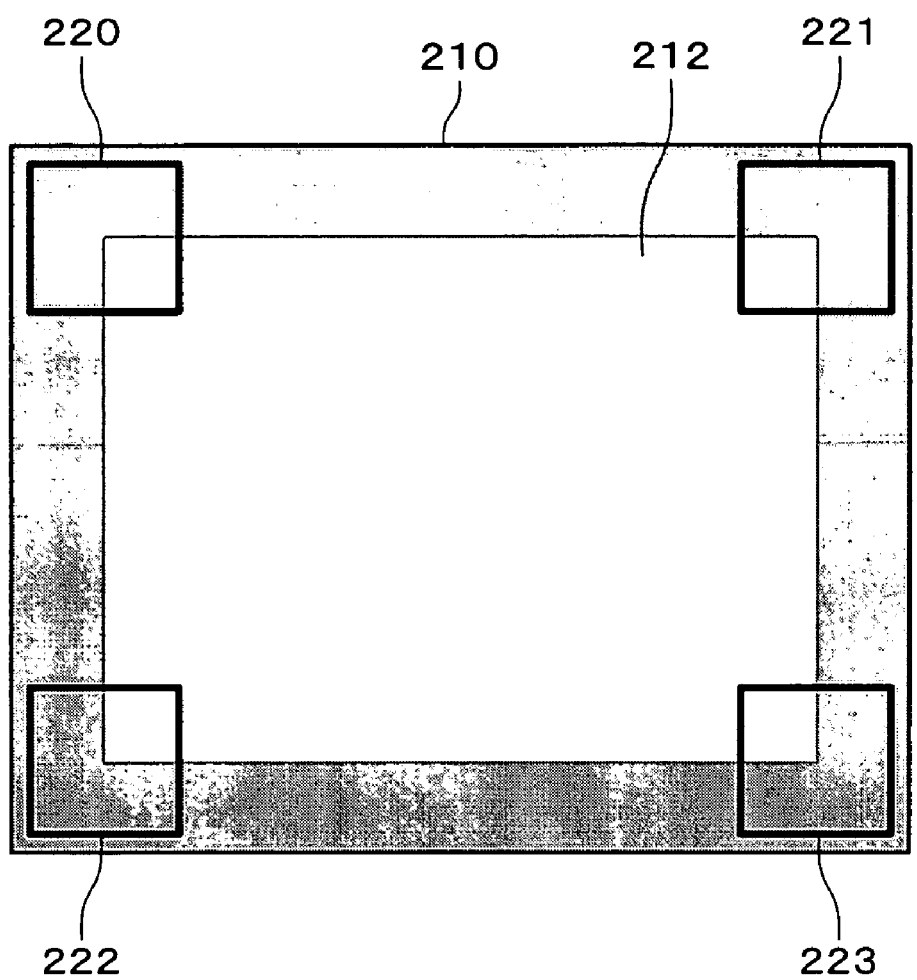
FIG. 2 is a diagrammatic view illustrating a processing of four corners in the image according to one form of this embodiment.
Figure 3A:
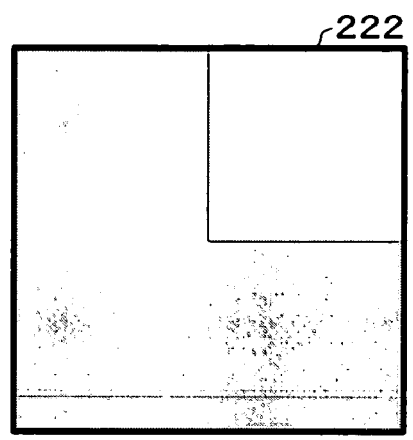
Figure 3B:
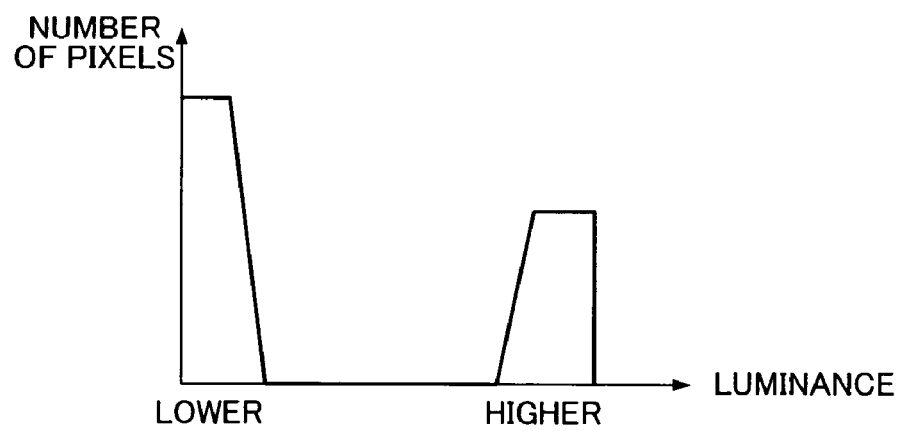
FIG. 3B is a diagrammatic view illustrating a focused luminance distribution.
Figure 4A:
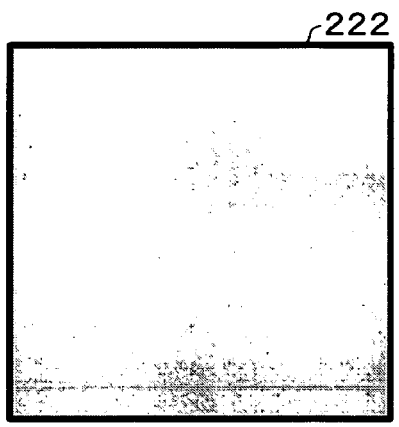
Figure 4B:
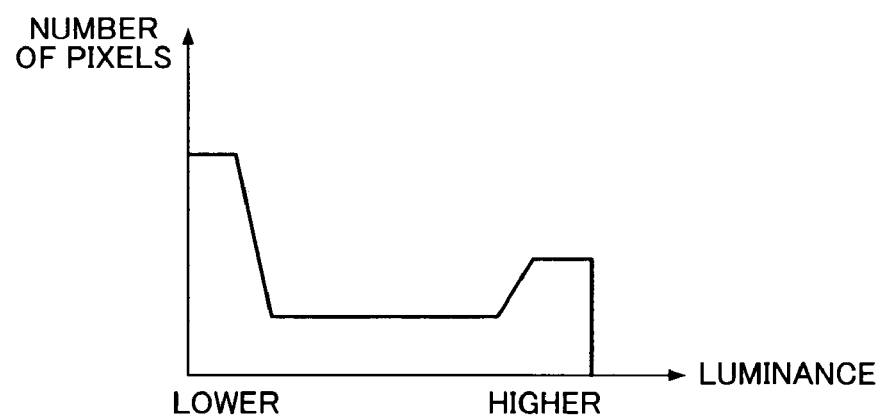
FIG. 4B is a diagrammatic view illustrating a defocused luminance distribution.

FIG. 2 is a diagrammatic view illustrating a processing of four corners in the image according to one form of this embodiment. FIG. 3A is a diagrammatic view illustrating a focused image; and FIG. 3B is a diagrammatic view illustrating a focused luminance distribution. FIG. 4A is a diagrammatic view illustrating a defocused image; and FIG. 4B is a diagrammatic view illustrating a defocused luminance distribution.

As shown in FIG. 2, a sensed image 210 includes a region 212 corresponding to the projection area 12 and the other region. The projector 20 has set boundary regions 220 to 223 to be processed which are regions in the vicinity of the aforementioned four corners.

For example, if the image is focused, the region 212 may clearly be sectioned from the other region in the boundary region 222 while the luminance distribution of the region 212 may clearly be separated from that of the other region.

On the other hand, if the image is defocused, the region 212 may not clearly be sectioned from the other region in the boundary region 222 while the luminance distribution of the region 212 may not clearly be separated from that of the other region.

The criterion for judging whether or not one region is clearly separated from the other region may be a criterion for judging whether or not the total number of pixels in a predetermined luminance range exceeds a threshold (i.e., whether or not the luminance distribution of the region 212 is separated from that of the other region) or a criterion for judging whether or not the luminance range in which the number of pixels does not exceed a threshold does not exceed the other threshold (i.e., that there are less regions which cannot be sectioned into either of the region 212 or other region).

In such a manner, the projector 20 of this embodiment determines the optimum focal length to each of four corners (boundary points) in the projection area 12, based on a change of luminance in the image due to the sensing information from the color light sensor 60.

In this embodiment, furthermore, the projector 20 derives the focal length to the center of the projection area 12 based on these determined focal lengths; derives coordinates in the four corners of the projection area 12 in a three-dimensional space based on the determined focal lengths and half angle-of-views of the projector 20 in the horizontal and vertical directions; derives the amount of distortion correction based on the coordinates in the three-dimensional space; and corrects image signals based on the amount of distortion correction.

Figure 12:
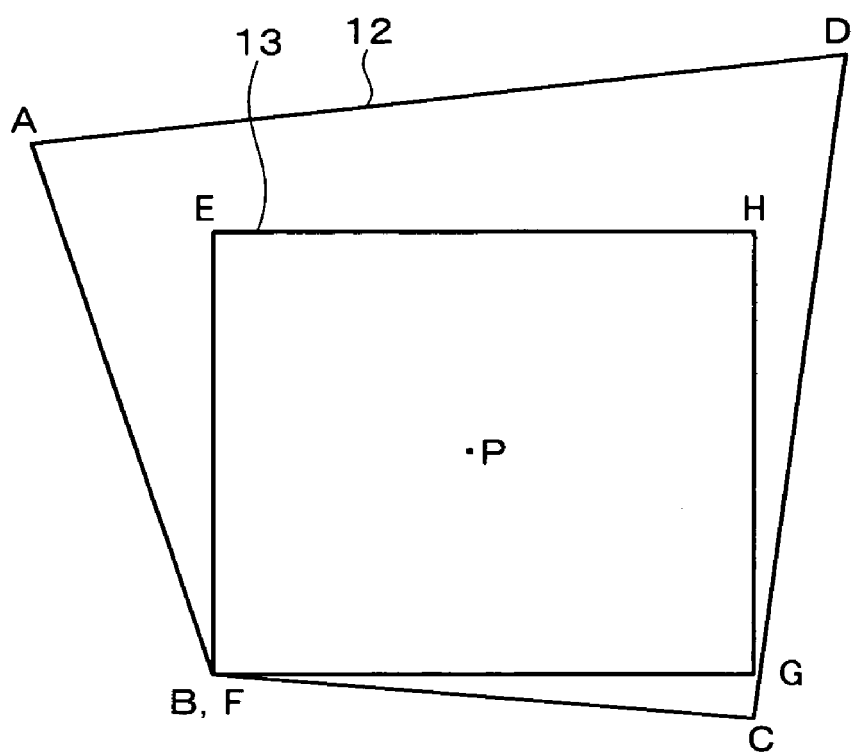
FIG. 12 is a diagrammatic view illustrating the projection area before the image distortion is corrected and after the image distortion has been corrected.

Furthermore, the projector 20 controls the driving of a lens unit having a focus adjustment function to provide a focal length to the center P of a projection area 13 which is provided by correcting the distortion in the projection area 12 shown in FIG. 12.

In such a manner, the projector 20 can perform the image distortion correction and focus adjustment approximately at the same time without changing a position in which an image is projected.

Functional Blocks

The functional blocks of the projector 20 for implementing such functions will be described blow.

Figure 5:
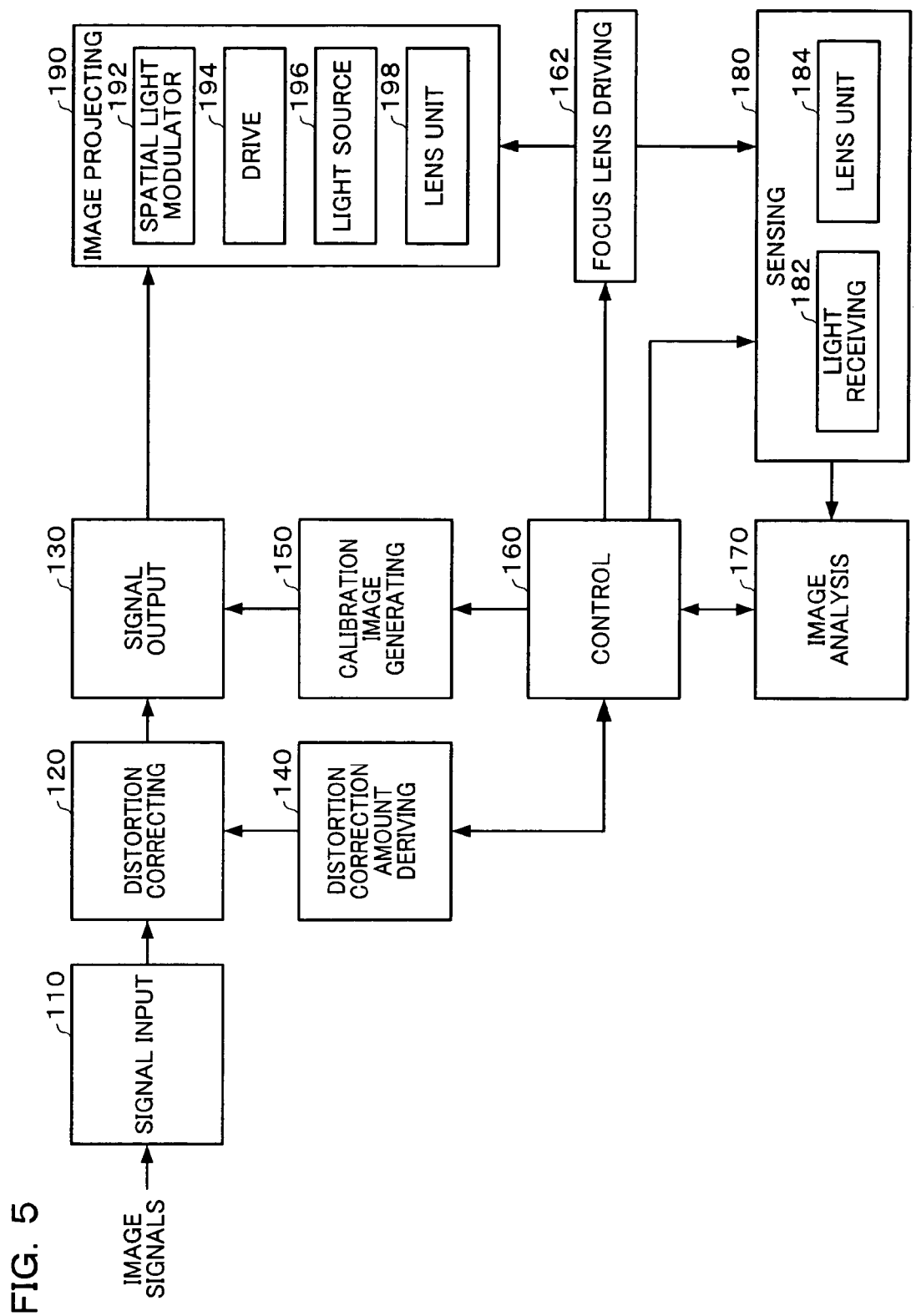
FIG. 5 is a functional block diagram of a projector according to one form of this embodiment.

FIG. 5 is a functional block diagram of a projector 20 according to one form of this embodiment.

The projector 20 comprises a signal input section 110 for inputting image signals; a distortion correcting section 120 for correcting the inputted image signals so that the image distortion is regulated; a signal output section 130 for outputting the corrected image signals; an image projecting section 190 for projecting an image based on the image signals; a sensing section 180 for sensing the projected image; and a distortion correction amount deriving section 140 for deriving the focal length to the center of the projection area 12 and also the amount of distortion correction provided by the distortion correcting section 120, based on sensing information.

The sensing section 180 comprises a lens unit 184 having a focus adjustment function and a light-receiving section 182 for receiving light from the lens unit 184.

The image projecting section 190 comprises a spatial light modulator 192, a drive section 194 for driving the spatial light modulator 192, a light source 196 and a lens unit 198 having a focus adjustment function.

The drive section 194 drives the spatial light modulator 192 based on image signals from the signal output section 130. The image projecting section 190 projects light from the light source 196 through the spatial light modulator 192 and lens unit 198.

The projector 20 further comprises a focus lens driving section 162 functioning as part of a drive control means and for driving the lens units 184 and 198; an image analysis section 170 functioning as part of a distortion correction amount deriving means and for analyzing the sensing information; a control section 160 functioning as part of the drive control means and for controlling the focus lens driving section 162 based on the sensing information; and a calibration image generating section 150 for generating calibration images used for correction.

Hardware for implementing the respective sections of the aforementioned projector 20 into a computer may be realized by the following components.

Figure 6:
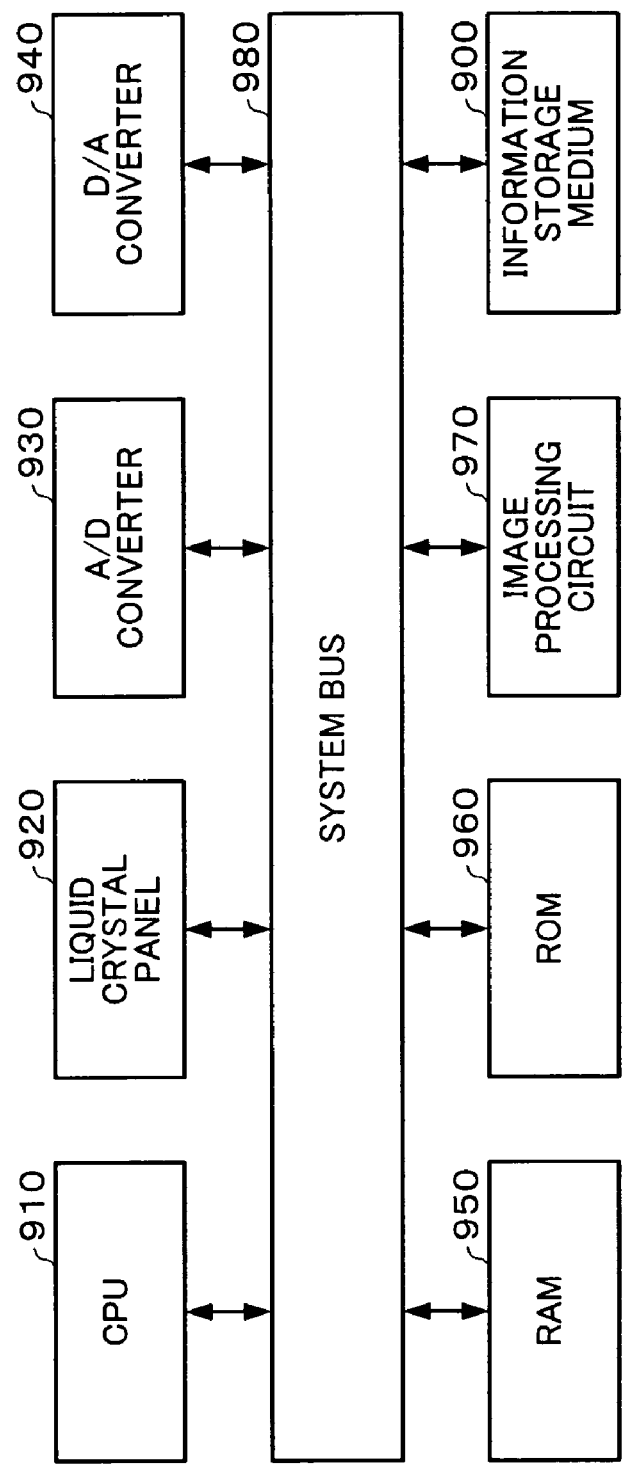
FIG. 6 is a hardware block diagram of a projector according to one form of this embodiment.

FIG. 6 is a hardware block diagram illustrating a projector 20 according to one form of this embodiment.

For example, the signal input section 110 may be implemented into the computer by using an A/D converter 930 or the like; the distortion correcting section 120 may be implemented into the computer by using an image processing circuit 970, RAM 950, CPU 910 or the like; the signal output section 130 may be implemented into the computer by using a D/A converter 940 or the like; the calibration image generating section 150 and image analysis section 170 may be implemented into the computer by using the image processing circuit 970, RAM 950 or the like, the control section 160 and focus lens driving section 162 may be implemented into the computer by using the CPU 910, RAM 950 or the like; the sensing section 180 may be implemented into the computer by using a CCD camera; and the spatial light modulator 192 may be implemented into the computer by using a liquid crystal panel 920, a ROM 960 for storing a liquid crystal light valve driver for driving the liquid crystal panel 920 or the like.

These sections may be configured to mutually deliver the information therebetween through a system bus 980. The color light sensor 60 is part of the sensing section 180.

These sections may partially or wholly be implemented into a computer in hardware manner such as circuits or software manner such as drivers.

Furthermore, the functions of the distortion correcting section 120 and the like may be implemented into the computer by reading a program for causing the computer to function as the distortion correcting section 120 and the like from an information storage medium 900 in which the program has been stored.

Such an information storage medium 900 may be implemented, for example, by CD-ROM, DVD-ROM, ROM, RAM, HDD or the like. Furthermore, the program stored in the information storage medium 900 may be read in either of contact or non-contact manner.

The aforementioned functions may be implemented into the computer by downloading a program for implementing the above functions into the computer or the like from a host device or the like through transmission channel, in place of the information storage medium 900.

Next, the flow of image processing using these sections will be described below.

Figure 7:
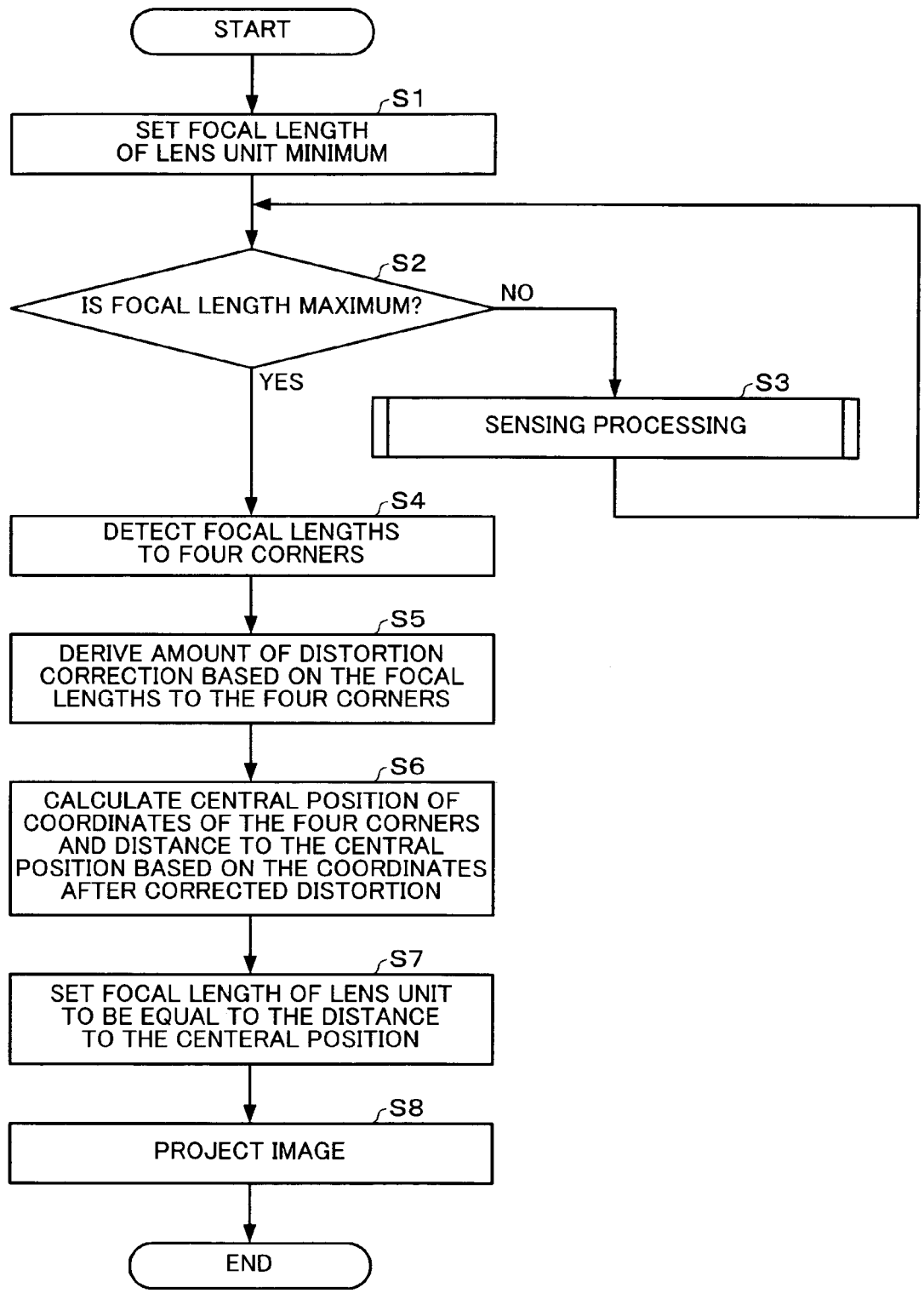
FIG. 7 is a flow chart illustrating a flow of image processing according to one form of this embodiment.

FIG. 7 is a flow chart illustrating a flow of image processing according to one form of this embodiment.

First of all, a user activates the projector 20 which in turn projects calibration images.

In an initial state, the control section 160 and focus lens driving section 162 controls the lens units 184 and 198 to minimize the focal lengths of the lens units 184 and 198 (step S1).

The projector 20 then executes the sensing process (step S3) until the focal lengths are maximized (step S2).

Figure 8:
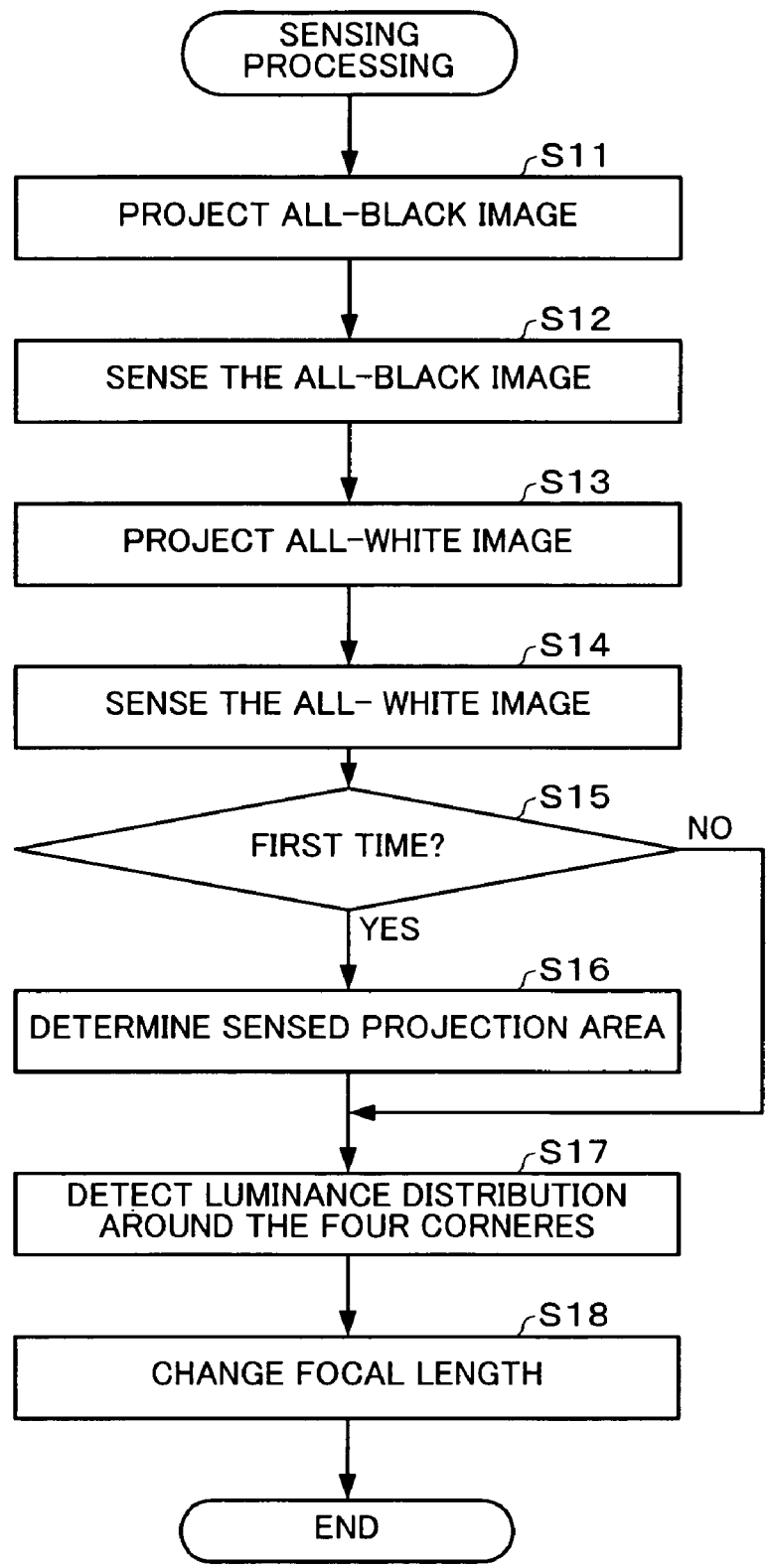
FIG. 8 is a flow chart illustrating a flow of sensing according to one form of this embodiment.

FIG. 8 is a flow chart illustrating a flow of image processing according to one form of this embodiment.

The projector 20 judges whether or not it is the first time. If it is the first time, a calibration image generating section 150 generates an all-black calibration image, and the image projecting section 190 projects the all-black calibration image (step S11).

The sensing section 180 senses a screen 10 onto which the all-black calibration image is projected (step S12).

The calibration image generating section 150 also generates an all-white calibration image and the image projecting section 190 projects the all-white calibration image (step S13).

The sensing section 180 senses the screen 10 onto which the all-white calibration image is projected (step S14).

The projector 20 then judges whether or not it is the first time (step S15) and selects a projection area only in the case of the first time (step S16). More particularly, the image analysis section 170 determines between a region 212 corresponding to the projection area 12 and the other region, based on a difference between the sensing information for the all-white calibration image and the sensing information for the all-black calibration image. The image analysis section 170 can identify boundary regions 220 to 223 in the subsequent process by having stored the information.

The image analysis section 170 then detects the luminance distribution around the region 212 at its four corners (step S17). The sensing section 180 may output the X, Y and Z values of an image as sensing information and the image analysis section 170 may detect the luminance distribution by handling Y-value among the X, Y and Z values as luminance.

It is to be noted that the X, Y and Z values are tristimulus values in the device independent type XYZ colorimetric system which is established by the Commission Internationale de l'Eclairage (CIE). In the XYZ colorimetric system, the Y-value can be handled as luminance value.

The control section 160 and focus lens driving section 162 controls the lens units 184 and 198 to change the focal lengths of the lens units 184 and 198 at regular intervals (step S18).

When the focal lengths are maximized during the above-mentioned sensing process (step S3), the image analysis section 170 detects distances from the projector 20 to the four corners of the projection area 12, based on the focal lengths stored in the control section 160 and the luminance distributions stored in the image analysis section 170 (step S4).

The control section 160 then transfers the information to the distortion correction amount deriving section 140. The distortion correction amount deriving section 140 then derives the amount of distortion correction, based on the distances to the four corners of the projection area 12 (step S5).

A process of deriving the amount of distortion correction will be described more in detail.

Figure 9:
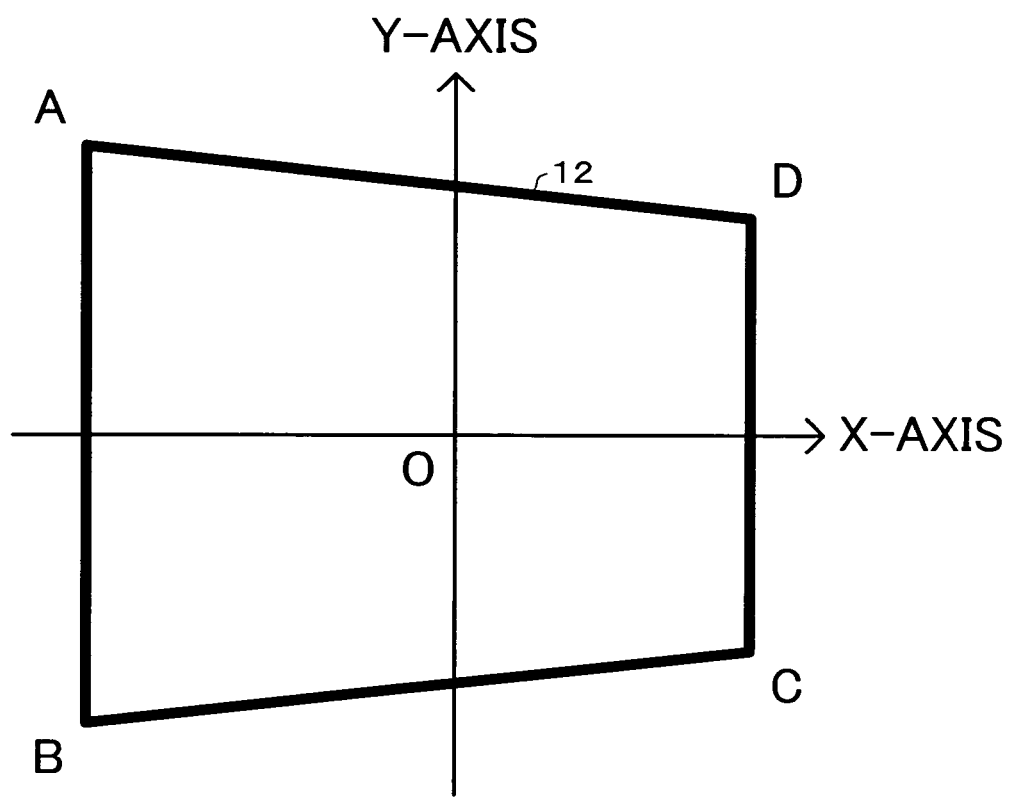
FIG. 9 is a diagrammatic view illustrating the front of an image when an image distortion occurs.
Figure 10:
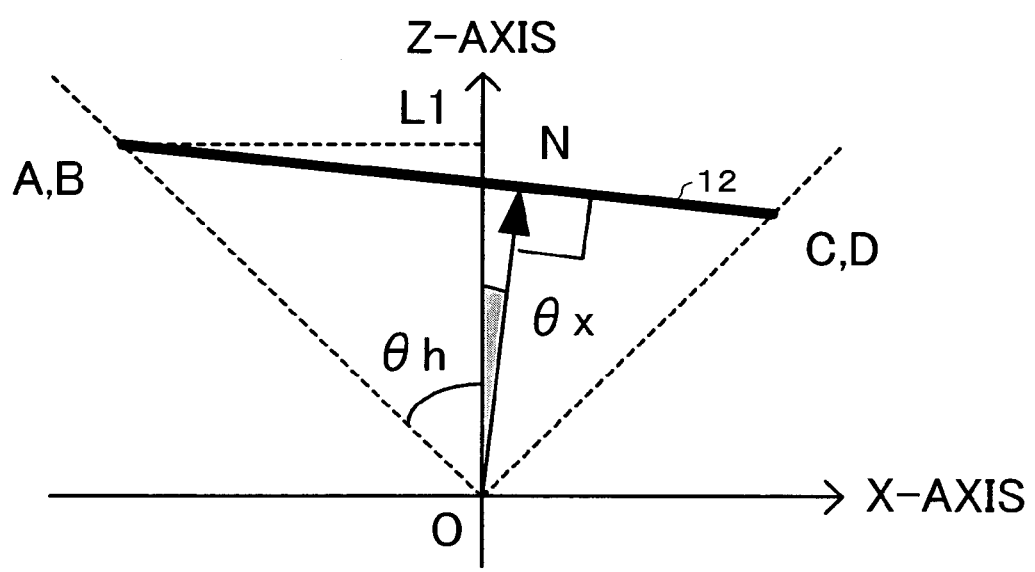
FIG. 10 is a diagrammatic view illustrating the top of the image when the image distortion occurs.
Figure 11:
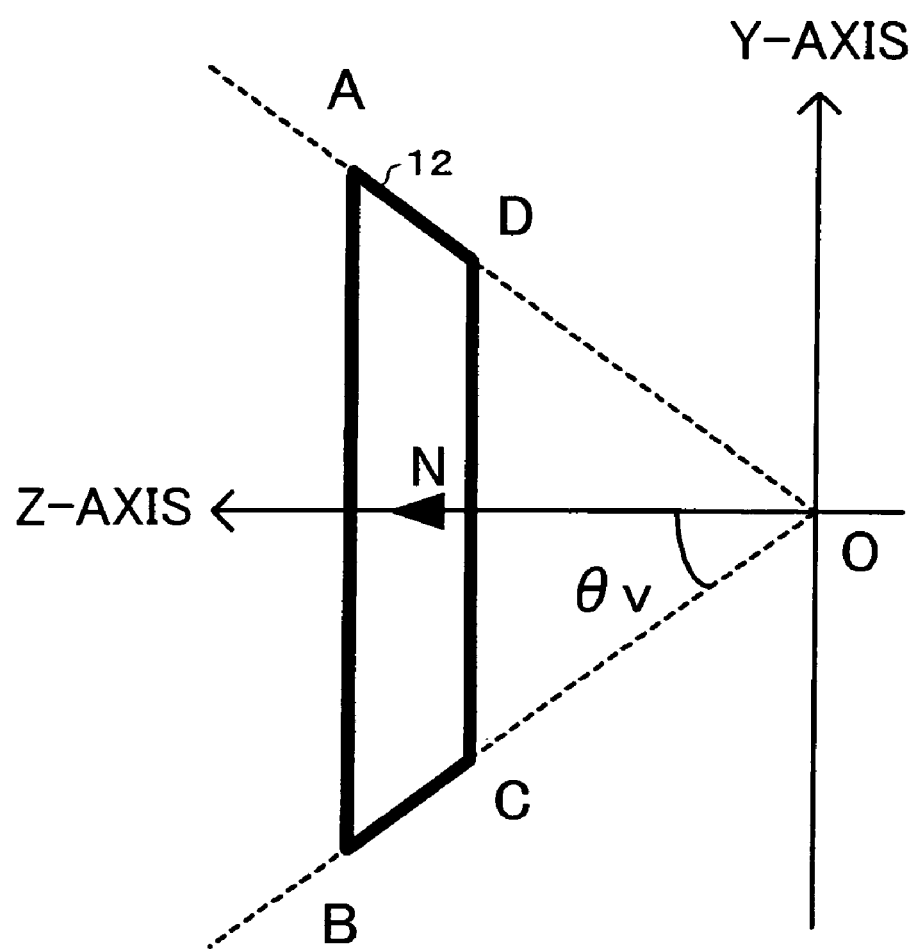
FIG. 11 is a diagrammatic view illustrating the side of the image when the image distortion occurs.

FIG. 9 is a diagrammatic view illustrating the front of an image when an image distortion occurs. FIG. 10 is a diagrammatic view illustrating the top of an image when an image distortion occurs. FIG. 11 is a diagrammatic view illustrating the side of an image when an image distortion occurs. FIG. 12 is a diagrammatic view illustrating a projection area 12 before its image distortion is corrected and a projection area 13 after its image distortion has been corrected.

It is assumed, for example, that a virtual three-dimensional space has its origin O through which a horizontal X-axis, a vertical Y-axis and a Z-axis orthogonal to the X and Y axes extend.

When it is assumed that the horizontal and vertical half angle-of-views in the projector 20 is $\theta h$ and $\theta v$ and that the focal lengths to the respective four corner points A, B, C and D are L1, L2, L3 and L4 (cm or other unit), respectively, the coordinates of the points A, B, C and D in the three-dimensional space can be determined by using the following trigonometric functions.

$A: (X1, Y1, Z1)=(-L1*\tan(\theta h), L1*\tan(\theta v), L1);$ $B:(X2, Y2, Z2)=(-L2*\tan(\theta h), -L2*\tan(\theta v), L2);$ $C:(X3, Y3, Z3)=(L3*\tan(\theta h), -L3*\tan(\theta v), L3);$ and $D:(X4, Y4, Z4)=(L4*\tan(\theta h), L4*\tan(\theta v), L4).$ A vector N perpendicular to the screen 10 is then determined using coordinate information for any three of the points A, B, C and D. The calculation of the coordinate information for the points A, C and D will be exemplified here.

$N=(Xn, Yn, Zn);$ $Xn=(Y4-Y3)*(Z1-Z4)-(Z4-Z3)*(Y1-Y4);$ $Yn=(Z4-Z3)*(X1-X4)-(X4-X3)*(Z1-Z4);$ and $Zn=(X4-X3)*(Y1-Y4)-(Y4-Y3)*(X1-X4).$ This vector N is then used to determine an angle included between the screen 10 and the projector 20, a horizontal half angle-of-view $\theta x$ and a vertical half angle-of-view $\theta y$.

$\theta x = a \tan(Xn/Zn);$ and $\theta y = a \tan(Yn/Zn).$

The angle information θx and θy are then used to obtain coordinates A', B', C' and D' in a liquid crystal light valve corrected with respect to its image distortion at the four corners from a table in which the angle information θx and θy have been associated with the amounts of correction in the x and y coordinates on the corrected liquid crystal light valve at the four corners thereof.

In such a manner, the image analysis section 170 can derive the amounts of correction based on the focal lengths L1, L2, L3 and L4 to the respective four corner points A, B, C and D (step S5).

The image analysis section 170 further computes a distance L5 to the center P of a frame represented by four corner coordinates E, F, G and H in the projection area 13 corrected with respect to its image distortion and shown in FIG. 12, based on the central coordinate position of a frame represented by coordinates A', B', C ' and D' indicative of a region corrected with its image distortion on the liquid crystal light valve and the actual distances L1 to L4 between the four corner coordinates A, B, C and D and the projector 20 (step S6).

The control section 160 and focus lens driving section 162 then control the lens unit 198 so that the focal length of the lens unit 198 becomes equal to L5 (step S7).

In such a manner, the distortion correcting section 120 corrects image signals from the input signal processing section 110 with an amount of correction by which the keystone distortion is corrected, and the image projecting section 190 projects an image adjusted with respect to its focal length, based on the corrected image signals (step S8).

As described, the projector 20 of this embodiment can correct the image distortion by deriving the coordinates of the four corners in the three-dimensional space, based on the change of luminance in the image, the optimum focal length to each of the four corners in the projection area 12 and the horizontal and vertical half angle-of-views while at the same time, it can drive the lens unit 198 to provide the focal length to the center of the projection area 12, based on the respective one of the optimum focal lengths.

Thus, the projector 20 can perform the image distortion correction and focus adjustment approximately at the same time.

According to this embodiment, the projector 20 can also perform the image distortion correction and focus adjustment approximately at the same time by determining the optimum focal length based on the distribution of luminance without applying any high-resolution camera.

According to this embodiment, furthermore, the projector 20 can perform the image distortion correction and focus adjustment more effectively by handling the respective vertexes in the rectangular image, in comparison with a case when the whole image is to be handled.

Since the color light sensor 60 functioning as part of the sensing section 180 will not detect directly any position, but may be lower in the resolution, the projector of the present invention may be produced with a reduced manufacturing cost.

Modifications

Although the embodiment of the present invention has been described, the present invention is not limited to the aforementioned forms.

The above embodiment has been described as to the derivation of the distortion amount correction using the table in which the amounts of distortion correction are associated with the values θx and θy. According to a modification of this embodiment, the projector 20 may be configured to use another table in which the three-dimensional coordinates for the four corner points A, B, C and D are associated with the amounts of correction. Thus, the projector 20 can determine the amounts of distortion correction without determining the values θx and θy. In addition, since the table used may be of two-dimensional structure using the values θx and θy as search keys in the system using these values, the table can be simplified in comparison with the system using the three-dimensional coordinates for the four corner points, thereby providing a further advantage by which the projector may be utilized for a so-called tele-wide (zoom and magnification) system.

Although the embodiment of the present invention has been described as to the repeated projecting, sensing and processing of the calibration images while changing the focal length from the minimum to maximum values, the projector 20 may be configured to finish all the handlings of the calibration images including the projection and the like at a point of time when the optimum focal lengths at the four corners of the projection area 12 have been detected.

The present invention is also effective for other image processing systems using various types of light sources such as CRTs (Cathode Ray Tubes), LEDs (Light Emitting Diodes) and the like, in addition to the projector 20.

The projector 20 may be in the form of a liquid crystal projector or a projector using a Digital Micromirror Device (DMD). DMD is a trademark possessed by Texas Instruments Incorporated in the U.S.

Additionally, the functions of the projector 20 may be accomplished by a single projector or by a plurality of decentralized processing device (e.g., one projector and one PC).

What is claimed is:

1. An image processing system comprising:
   distortion correction means for correcting image signals to adjust the distortion in an image;
   image projection means including a lens unit which has a focus adjustment function, the lens unit projecting an image based on the corrected image signals;
   drive control means for controlling driving of the lens unit so that a focal length of the lens unit to an image projection area changes;
   sensing means for sensing the projected image; and
   distortion correction amount deriving means for deriving the focal length to a center of the image projection area and deriving an amount of distortion correction for the distortion correction means, based on sensing information from the sensing means,
   wherein the distortion correction amount deriving means determines an optimum focal length to each of a plurality of boundary points in the image projection area, based on a change of luminance in a sensed image according to the sensing information; derives the focal length to the center of the image projection area, based on the optimum focal length to each of the boundary points; derives coordinates of the boundary points in a three-dimensional space, based on the optimum focal length to each of the boundary points and horizontal and vertical half angle-of-views in the image projection means; and derives the amount of distortion correction, based on the coordinates in the three-dimensional space,
   wherein the distortion correction means corrects the image signals, based on the derived amount of distortion correction, and
   wherein the drive control means controls the driving of the lens unit so that the focal length of the lens unit becomes the focal length to the center of the image projection area derived by the distortion correction amount deriving means.

2. The image processing system as defined in claim 1, wherein the distortion correction amount deriving means determines the optimum focal length, based on a luminance distribution representing a relationship between luminance and number of pixels in a boundary region around each of the boundary points in a sensed image projection area according to the sensing information, on condition that the luminance distribution inside the sensed image projection area is different from the luminance distribution outside the image projection area.

3. The image processing system as defined in claim 2, wherein the image projection means projects a black colored image and a white colored image, and
wherein the distortion correction amount deriving means determines the sensed image projection area, based on a difference between the sensing information for the black colored image and for the white colored image.

4. The image processing system as defined in claim 1, wherein the image is rectangular, and
wherein each of the boundary points is the corresponding one of vertexes of the rectangular image.

5. An image processing system comprising:
a distortion correction section which corrects image signals to adjust the distortion in an image;
an image projection section which includes a lens unit which has a focus adjustment function, the lens unit projecting an image based on the corrected image signals;
a drive control section which controls driving of the lens unit so that a focal length of the lens unit to an image projection area changes;
a sensing section which senses the projected image; and
a distortion correction deriving section which derives the focal length to a center of the image projection area and derives an amount of distortion correction provided by the distortion correction section, based on sensing information from the sensing section,
wherein the distortion correction deriving section determines an optimum focal length to each of a plurality of boundary points in the image projection area, based on a change of luminance in a sensed image according to the sensing information; derives the focal length to the center of the image projection area, based on the optimum focal length to each of the boundary points; derives coordinates of the boundary points in a three-dimensional space, based on the optimum focal length to each of the boundary points and horizontal and vertical half angle-of-views in the image projection section; and derives the amount of distortion correction, based on the coordinates in the three-dimensional space,
wherein the distortion correction section corrects the image signals, based on the derived amount of distortion correction, and
wherein the drive control section controls the driving of the lens unit so that the focal length of the lens unit becomes the focal length to the center of the image projection area derived by the distortion correction deriving section.

6. A projector comprising:
distortion correction means for correcting image signals to adjust the distortion in an image;
image projection means including a lens unit which has a focus adjustment function, the lens unit projecting an image based on the corrected image signals;
drive control means for controlling driving of the lens unit so that a focal length of the lens unit to an image projection area changes;
sensing means for sensing the projected image; and
distortion correction amount deriving means for deriving the focal length to a center of the image projection area and deriving an amount of distortion correction for the distortion correction means, based on sensing information from the sensing means,
wherein the distortion correction amount deriving means determines an optimum focal length to each of a plurality of boundary points in the image projection area, based on a change of luminance in a sensed image according to the sensing information; derives the focal length to the center of the image projection area, based on the optimum focal length to each of the boundary points; derives coordinates of the boundary points in a three-dimensional space, based on the optimum focal length to each of the boundary points and horizontal and vertical half angle-of-views in the image projection means; and derives the amount of distortion correction, based on the coordinates in the three-dimensional space,
wherein the distortion correction means corrects the image signals, based on the derived amount of distortion correction, and
wherein the drive control means controls the driving of the lens unit so that the focal length of the lens unit becomes the focal length to the center of the image projection area derived by the distortion correction amount deriving means.

7. A projector comprising:
a distortion correction section which corrects image signals to adjust the distortion in an image;
an image projection section which includes a lens unit which has a focus adjustment function, the lens unit projecting an image based on the corrected image signals;
a drive control section which controls driving of the lens unit so that a focal length of the lens unit to an image projection area changes;
a sensing section which senses the projected image; and
a distortion correction deriving section which derives the focal length to a center of the image projection area and derives an amount of distortion correction provided by the distortion correction section, based on sensing information from the sensing section,
wherein the distortion correction deriving section determines an optimum focal length to each of a plurality of boundary points in the image projection area, based on a change of luminance in a sensed image according to the sensing information; derives the focal length to the center of the image projection area, based on the optimum focal length to each of the boundary points; derives coordinates of the boundary points in a three-dimensional space, based on the optimum focal length to each of the boundary points and horizontal and vertical half angle-of-views in the image projection section; and derives the amount of distortion correction, based on the coordinates in the three-dimensional space,
wherein the distortion correction section corrects the image signals, based on the derived amount of distortion correction, and wherein the drive control section controls the driving of the lens unit so that the focal length of the lens unit becomes the focal length to the center of the image projection area derived by the distortion correction deriving section.

8. An information storage medium which stores a computer-readable program for causing a computer to function as:

distortion correction means for correcting image signals to adjust the distortion in an image;

drive control means for controlling driving of a lens unit and driving of a sensing section, the lens unit projecting an image based on the corrected image signals and having a focus adjustment function for changing a focal length of the lens unit to an image projection area, and the sensing section sensing the projected image; and distortion correction amount deriving means for deriving the focal length to a center of the image projection area and deriving an amount of distortion correction for the distortion correction means, based on sensing information from the sensing means, wherein the distortion correction amount deriving means determines an optimum focal length to each of a plurality of boundary points in the image projection area, based on a change of luminance in a sensed image according to the sensing information; derives the focal length to the center of the image projection area, based on the optimum focal length to each of the boundary points; derives coordinates of the boundary points in a three-dimensional space, based on the optimum focal length to each of the boundary points and horizontal and vertical half angle-of-views in the image projection means; and derives the amount of distortion correction, based on the coordinates in the three-dimensional space, wherein the distortion correction means corrects the image signals, based on the derived amount of distortion correction, and wherein the drive control means controls the driving of the lens unit so that the focal length of the lens unit becomes the focal length to the center of the image projection area derived by the distortion correction amount deriving means.

9. An image processing method comprising:

projecting a predetermined calibration image while changing a focal length of a lens unit;

sensing the calibration image depending on a change in the focal length of the lens unit;

determining an optimum focal length to each of a plurality of boundary points in an image projection area, based on a change of luminance in a sensed image according to sensing information;

deriving coordinates of the boundary points in a three-dimensional space, based on the optimum focal length to each of the boundary points and horizontal and vertical half angle-of-views in image projection means;

deriving an amount of distortion correction, based on the coordinates in the three-dimensional space;

correcting image signals so that distortion in the image is corrected, based on the derived amount of distortion correction;

deriving a focal length to a center of the image projection area, based on the optimum focal length to each of the boundary points in the image projection area;

changing the focal length of the lens unit so that the focal length of the lens unit becomes the derived focal length to the center of the image projection area; and projecting the image, based on the corrected image signals.

10. The image processing method as defined in claim 9, comprising:

determining the optimum focal length, based on a luminance distribution representing a relationship between luminance and number of pixels in a boundary region around each of the boundary points in a sensed image projection area according to the sensing information, on condition that the luminance distribution inside the sensed image projection area is different from the luminance distribution outside the image projection area.

11. The image processing method as defined in claim 10, comprising:

projecting at least a black colored image and a white colored image as the calibration image; and determining the sensed image projection area, based on a difference between the sensing information for the black colored image and for the white colored image.

12. The image processing method as defined in claim 9, wherein the image is rectangular, and wherein each of the boundary points is the corresponding one of vertexes of the rectangular image.

* * * * *